United States Patent
Grimmett

(10) Patent No.: US 6,477,633 B1
(45) Date of Patent: Nov. 5, 2002

(54) APPARATUS WITH MENU-SELECTED FUNCTIONS

(75) Inventor: Alan Grimmett, Burpham (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/482,568

(22) Filed: Jun. 7, 1995

Related U.S. Application Data

(63) Continuation of application No. 08/343,841, filed on Nov. 23, 1994, now abandoned, which is a continuation of application No. 07/987,012, filed on Dec. 7, 1992, now abandoned.

(30) Foreign Application Priority Data

Dec. 14, 1991 (GB) .............................................. 9126598

(51) Int. Cl.$^7$ .............................................. G06F 12/00
(52) U.S. Cl. ...................................................... 711/206
(58) Field of Search ................................. 395/416, 406, 395/830, 887, 893; 364/255.7, 955.5; 340/825.22, 825.31, 825.44, 825.52; 345/172, 902; 379/58; 455/89

(56) References Cited

U.S. PATENT DOCUMENTS

| | | | | |
|---|---|---|---|---|
| 4,500,952 A | * | 2/1985 | Heller et al. ................. | 315/400 |
| 4,523,298 A | * | 6/1985 | Sakurai ...................... | 364/955.5 |
| 4,802,114 A | * | 1/1989 | Sogame ..................... | 364/955.5 |
| 4,875,230 A | * | 10/1989 | Blair .......................... | 379/58 |
| 4,964,075 A | * | 10/1990 | Shaver et al. ................ | 395/887 |
| 4,991,171 A | * | 2/1991 | Teraslinna et al. ..... | 340/825.52 |
| 5,099,233 A | * | 3/1992 | Keenan .................. | 340/825.22 |
| 5,117,492 A | * | 5/1992 | Nash .......................... | 395/400 |
| 5,210,841 A | * | 5/1993 | Johnson ...................... | 395/400 |
| 5,259,018 A | * | 11/1993 | Grimmett et al. ............. | 379/58 |
| 5,313,611 A | * | 5/1994 | Franklin et al. ............. | 395/416 |
| 5,491,790 A | * | 2/1996 | Keeley et al. | |

OTHER PUBLICATIONS

Mobira 500–Series Owner's Manual, Nokia–Mobira Oy, 1988, pp. 1–44.*
Owner's manual for Mobira 300–Series Cellular Telephones, Nokia–Mobira Oy, 1986, pp. 1–51.*
Technophone MC985A AMPS Mobile Telephone User Guide, Technophone Limited, Jun. 1991, pp. 1–36.*

* cited by examiner

*Primary Examiner*—Mark H. Rinehart
*Assistant Examiner*—Jason D. Cardone
(74) *Attorney, Agent, or Firm*—Perman & Green, LLP

(57) ABSTRACT

Electronic apparatus, such as a mobile telephone, under control of a microprocessor (7) and having a set of menu-selectable functions. Each function has an address associated therewith. The user can enter a particular address using a keyboard (3) to select one of the functions. A look-up table (10) is included for converting the user-input address to a function address. For example, the look-up table may correlate input address 03 with function address 08 so that when the user enters 03 the function at location 08 is actually selected. The look-up table can easily be reconfigured to provide different sets of menu-selectable functions for different product variants without having to modify the operating software (or associated hardware) in each case.

24 Claims, 1 Drawing Sheet

APPARATUS WITH MENU-SELECTED FUNCTIONS

CROSS-REFERENCE TO RELATED APPLICATIONS

This is a continuation of U.S. application Ser. no. 08/343,841, filed Nov. 23, 1994 now abandoned, which is a continuation of U.S. application Ser. No. 07/987,012, filed Dec. 7, 1992, abandoned.

This invention relates to an electronic apparatus having a plurality of user selectable functions.

BACKGROUND OF THE INVENTION

Nowadays various kinds of electronic apparatus include a microcomputer and it is common in such apparatus for the user to be able to select a particular operating function using a so-called menu. In essence a menu is a set of choices which the user can take in a computer program. Generally the user selects a particular choice by entering the address or location of the desired function in memory. The address is usually entered by pressing appropriate buttons or keys of a keypad, and the selected function may be indicated on a visual display.

Menu selection is frequently used, for example, in radio telephones to permit the user to access and selectively enable a wide range of functions. Typically a menu facility is utilized for setting and displaying a clock, displaying the apparatus' own telephone number etc. The mobile cellular telephone marketed by the Applicant under trade mark MC905 includes an array of advanced functions which are menu-selectable.

It will be appreciated that it is sometimes desirable to offer variants of a product, eg for different markets or for different territories, in which different functions may be available. For example a particular function may be required for one country or for a fully featured top of the range product, whereas it may be desirable to omit the same function for another country or for a less expensive product.

In the aforementioned Technophone MC905 product, the operating instructions (software) pertaining to the various functions, and the addresses therefor are stored in EEPROM contained in the transceiver housing. Each product variant is provided with a different EEPROM containing the relevant software.

SUMMARY OF THE INVENTION

According to the present invention there is provided electronic apparatus having a plurality of user selectable functions, each function having a respective address associated therewith, means enabling the user to enter a first address from a predetermined set of addresses for selecting one of said functions, and means for correlating each address of said predetermined set of addresses with a respective second address, wherein in response to the user entering a first address a function is selected according to the second address correlated with said first address by said correlating means.

An electronic apparatus in accordance with the invention has the advantage that the user selectable features may readily be reconfigured by changing or altering the correlating means, without the need for revising the main operating instructions, i.e. software, relating thereto. Hence common software may be used for all different product variants simply by using an appropriately configured correlating means.

The correlating means, suitably in the form of a look-up table, e.g. stored in random access memory (RAM), is preferably adapted to have one or more of the second addresses altered. Hence the correlating means can be re-configured in situ to provide a predetermined set of user selectable features for a particular product variant without changing either the hardware or the main operating software. In other words there is no need to have a different storage medium (e.g. EEPROM) containing different versions of software for the different product variants.

In a preferred embodiment a further memory is provided for storing the predetermined set of addresses and the respective second set of addresses. The address data may be automatically transferred from the further memory to the look-up table of the correlating means.

The further memory may form part of the same device used for storing the operating instructions relating to the user selectable features. Alternatively the electronic apparatus may comprise a main body and a remote device adapted to be removably coupled thereto, the look-up table being provided in the main body and the further memory means in the remote device. Means are also provided for detecting when the remote device is coupled to the main body, and means responsive to the detecting means automatically transfer the stored addresses from the further memory means to the look-up table when the remote device is coupled to the main body.

If the look-up table is stored in random access memory which is volatile, the information content will be lost each time the power is disconnected. In this case it may be arranged for the address data to be transferred automatically from the further memory means to the look-up table each time the power is restored. Hence the look-up table is refreshed automatically.

BRIEF DESCRIPTION OF THE DRAWING

An embodiment of the invention will now be described, by way of example, with reference to the accompanying drawing, in which:

the single FIGURE is a schematic diagram of a mobile cellular telephone apparatus in accordance with the invention.

DETAILED DESCRIPTION OF THE INVENTION

Figure 1:
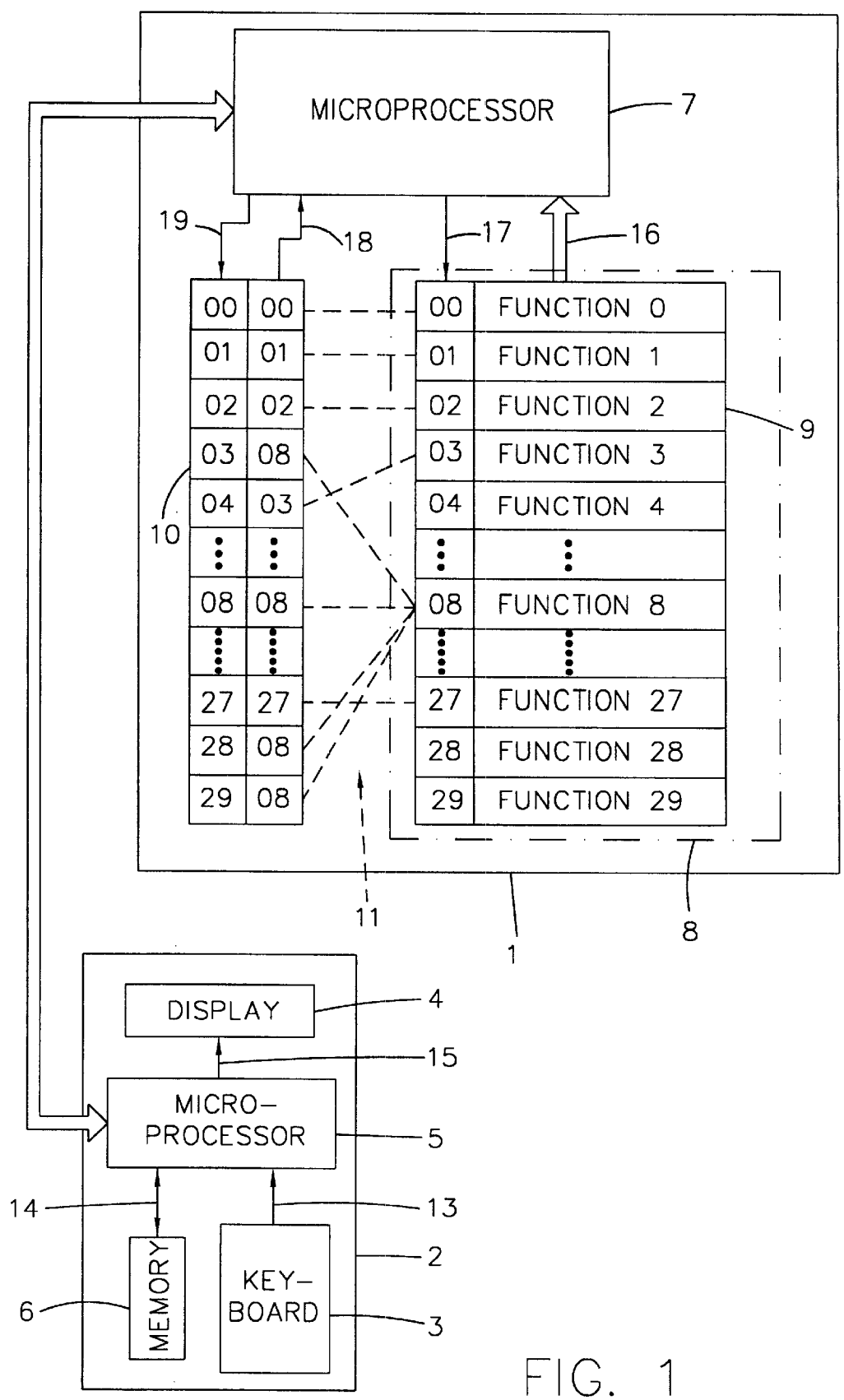

The mobile cellular telephone shown in FIG. 1 includes a transceiver housing 1 and a handset 2 which may be removably coupled thereto in conventional manner as generally illustrated by interconnection arrow 12. Typically the handset is connected via a coil cord to a cradle (not shown), and via a cable from the cradle to the transceiver.

The handset 2 is itself conventional and comprises a user interface including a keyboard 3 and a visual display 4 coupled to a local microprocessor 5. Identity information, eg the electronic serial number (ESN) and the subscriber number are stored in a memory 6, specifically an EEPROM, also coupled to the local microprocessor 5. The functional interconnection of keyboard 3, display 4, microprocessor 5 and memory 6 is schematically illustrated by interconnect arrow 13–15. It is noted here that it is not essential for the handset to include a local microprocessor since the functions of the handset may alternatively be controlled by a microprocessor 7 in the transceiver housing 1.

The microprocessor 7 in the transceiver housing is employed to control all the basic functions of the mobile telephone in conventional manner. Coupled to the microprocessor 7 is an EEPROM 8 in which may be stored some or all of the operating software for the telephone and, for example, a telephone number index for storing useful telephone numbers. In particular the EPROM comprises a portion 9 in which is stored the software relating to a number of user selectable functions. Each function has a respective address associated therewith.

A particular function is selected according to its address. As shown schematically in the figure the address 00 corresponds to FUNCTION 0, address 01 corresponds to FUNCTION 1, address 02 corresponds to FUNCTION 2 and so on. In the present embodiment thirty different functions are provided as shown in the following table.

TABLE

| Address | Function |
|---------|----------|
| 00 | Display own phone number |
| 01 | Display own serial number |
| 02 | Display last call time |
| 03 | Display airtime 'tripmeter' |
| 04 | Alpha search |
| 05 | 1 minute alert tone |
| 06 | Ignition sense |
| 07 | Horn alert |
| 08 | No function |
| 09 | Auto redial |
| 10 | Alarm clock |
| 11 | Mobile/Portable |
| 12 | Call barring Receive only |
| 13 | Restricting Memory Recall |
| 14 | Call barring International Calls |
| 15 | System ID Lock |
| 16 | Change Personal Identification Number |
| 17 | Enable Service Mode |
| 18 | Erase whole memory |
| 19 | Auto roam |
| 20 | Normal/Inverted |
| 21 | Auto Home NAM Scan |
| 22–29 | NAM Selection |

A brief description of these functions will now be given.

Function 00 displays the subscriber's own telephone number on handset display 4.

Function 01 displays the electronic serial number (ESN) on the handset display 4.

Function 02 displays the duration of the last telephone call on the display 4.

Function 03 displays the duration of the current call.

Function 04 allows the user to retrieve stored telephone numbers using only the first letter of an associated alpha tag as a guide.

Function 05 produces an audible tone as a reminder of the length of call. The first tone occurs 50 seconds after the call is initiated. Subsequent tones occur 10 seconds before each new minute of call time. This gives the caller the opportunity to terminate a call before another complete minute has elapsed.

Function 06 enables the telephone to be switched on and off with the ignition key.

Function 07 provides an external alert of an incoming call. The call activates either an audible or visual alert such as a horn or lights.

Function 08 has no operating function associated therewith and may simply return a message such as "Not Available" on the handset display 4.

Function 09 allows an unsuccessful call attempt to be redialled automatically after a pre-set number of minutes.

Function 10 permits the telephone to act as an alarm clock. The telephone will ring after a pre-set number of minutes.

Function 11 enables the mobile telephone to be configured as a portable and behave accordingly.

Function 12 prevents outgoing calls until the status is reset by entering the user's personal identification number (PIN).

Function 13 prevents unauthorized outgoing calls other than those from a predetermined number of memory locations.

Function 14 prevents international calls being made.

Function 15 restricts the ability of the telephone to make calls on a predetermined system identity.

Function 16 enables the personal identification number (PIN) to be changed.

Function 17 causes the telephone to enter the service mode and display technical details of the current service status.

Function 18 erases the contents of the telephone number index.

Function 19 makes the telephone scan the different system channels.

Function 20 allows selection of the system type on which the telephone will operate.

Function 21 causes the telephone to reject signals from all but the home system until all channels of the home system have been scanned.

Functions 22–29. Eight different number assignment modules (NAM's) may be stored in the locations 22–29 respectively. A NAM is enabled by selecting the appropriate menu function.

In the prior art the user would select a particular function by entering on the keyboard 3 the memory location of the desired function. Hence to display the ESN the user would enter 01. There is a direct correspondence between the location of the function to be selected and the address entered by the user.

However, in accordance with the present invention the transceiver housing further includes a look-up table 10, suitably stored in a separate random access memory (RAM). The functional interconnection of the EEPROM 8, portion 9 and the table 10 to the microprocessor 7 is schematically illustrated by interconnect arrow 16–19. In essence the look up table includes two columns of addresses in correlated relationship. The first column corresponds to the address entered by the user on the keyboard 3, whereas the second column corresponds to the location of the functions in the EEPROM portion 9. The correlated addresses in the two columns may be the same or different as illustrated in the figure. As shown, the input address 00, 01, and 02 are all correlated with the same function addresses 00, 01 and 02 respectively. However, input address 03 is correlated with function address 08 as are input addresses 28 and 29. Input address 04 is correlated with function address 03.

Thus, when the user enters 00 on the keyboard, the look-up table will be consulted, 00 will be found as the correlated function address and hence FUNCTION 0 will be selected and the appropriate message will be returned on the handset display 4.

Likewise, when the user enters 01 or 02 FUNCTION 1 or FUNCTION 2 will be selected respectively.

However, when the user enters 03, 28, or 29 on the keyboard, the look-up table 10 will be consulted, and 08 will be found as the correlated function address. From the table it will be seen that FUNCTION 8 is not an active function and therefore a message such as "NOT AVAILABLE" may be returned on the display 4.

When the user enters 04 on the other hand, the look-up table will correlate the input address with a function address of 03 and hence FUNCTION 3 will in fact be selected.

The broken line arrows 11 between RAM 10 and EEPROM portion 9 in the figure show how the look-up table 10 acts as a pointer to the particular function to be selected.

It will now be appreciated that the set of functions available to the user can readily be changed by altering the second column of correlated function addresses in the look-up table. Thus, for example, if a function is intended to be unavailable the function address stored in the look-up tables (second column) simply needs to be altered to 08.

Also, the order of the functions (as addressed by the user) can be changed in a similar manner. Thus, for example, if it is desired for FUNCTION 4 to precede FUNCTION 3 the respective address locations can in effect be interchanged by altering the look-up table so that the function address 04 is correlated with the input address 03 and vice versa.

Hence it will be seen that, by re-configuring the look-up table it is possible to provide a predetermined set of user selectable functions, eg for different product variants, without changing the EEPROM (software or hardware).

The RAM 10 is volatile and therefore the information stored therein is lost whenever the power is switched off.

In the present embodiment the information content of the look-up table 10 is stored in the handset memory 6. Under the management of microprocessor 7, the transceiver is capable of detecting when a handset is coupled thereto. When the power is switched on and the presence of a handset is detected, the address information is automatically downloaded (transferred) from the handset memory 6 to the transceiver RAM 10. This is particularly advantageous because the set of functions which are to be made accessible to the user are thus determined by the address information stored in the handset memory 6. Thus, a common transceiver using common software in EEPROM 8 may be used for a range of product variants, with the information for the look-up table simply being stored in the handset memory. In other words the set of menu-selectable functions available will be determined merely by the handset coupled to the transceiver. Indeed, different functions will be available in the case of different handsets depending on the address information stored in the handset memories.

Also, a set of default address information e.g. a selected minimum sub-set of the full set of function addresses, may be stored in the EEPROM. Thus, if the power, is disconnected and the transceiver detects that there is no handset coupled thereto, or that the handset memory does not contain the relevant address information, then the default address information will be transferred automatically from the EEPROM 8 to the look-up table 10 and hence at least a limited menu selection facility will be operational regardless of the status of the handset.

In view of the foregoing description it will be evident to a person skilled in the art that various modifications may be made within the scope of the present intervention.

What is claimed is:

1. Electronic apparatus comprising:
   means for selecting a first address from a predetermined set of first addresses;
   means for providing a plurality of user selectable functions, each of the functions having a respective second address associated therewith;
   means for correlating each of the first addresses with one of the second addresses wherein, upon selection of one of the first addresses, the user selectable function associated with the second address correlated with the selected first address is selected, wherein all of the first addresses are correlated with the second addresses; and
   means for altering correlation between the first and second addresses to allow the functions to be accessed by the first addresses in a selectable order.

2. Electronic apparatus as claimed in claim 1, wherein the correlating means comprises first memory means adapted to store in correlated relationship the predetermined set of first addresses and at least some of the second addresses.

3. Electronic apparatus as claimed in claim 2, further including a second memory means for storing correlation data of the predetermined set of first addresses with the second addresses and, means for automatically transferring the correlation data from the second memory means to the first memory means.

4. Electronic apparatus as claimed in claim 3, wherein the first memory means is volatile and the transferring means automatically transfers the correlation data from the second memory means to the first memory means when electrical power is established.

5. Electronic apparatus as claimed in claim 4, wherein the first memory means comprises a random access memory.

6. Electronic apparatus as claimed in claim 3, further including a main body and a remote device adapted to be removably coupled to the main body, the first memory means being provided in the main body and the second memory means being provided in the remote device, the apparatus further including means for detecting when the remote device is coupled to the main body, and means responsive to the detecting means for automatically transferring the stored correlation data from the second memory means to the first memory means when the remote device is coupled to the main body.

7. Electronic apparatus as claimed in claim 3, wherein the second memory means forms part of a memory having portions for storing information other than the correlation data.

8. Electronic apparatus as in claim 1 wherein the first addresses are correlated, by the means for correlating, to only a limited number of the second addresses, the limited number being less than a total number of the second addresses.

9. Electronic apparatus as in claim 1 wherein the means for altering comprises means for enabling a user to alter the correlation of at least one of the first addresses with the second addresses.

10. Electronic apparatus as in claim 1 wherein the means for correlating has more than one of the first addresses correlated with a single one of the second addresses.

11. Electronic apparatus as in claim 1 wherein the means for correlating has each of the first addresses correlated with a respective separate one of the second addresses.

12. Electronic apparatus comprising:
    means for selecting a first address from a predetermined set of first addresses;
    means for providing a plurality of user selectable functions, each of the functions having a respective second address associated therewith; and
    means for correlating each of the first addresses with one of the second addresses, wherein all of the first addresses are correlated with the second addresses; and
    means for altering correlation of the first addresses with the second addresses; wherein upon selecting one of the first addresses, a single correlated one of the second addresses is selected to perform the function associated therewith.

13. Electronic apparatus as in claim 12 wherein the means for altering comprises means for enabling a user to alter the correlation of at least one of the first addresses with the second addresses.

14. Electronic apparatus as claimed in claim 12, wherein the correlating means comprises first memory means adapted to store in correlated relationship the predetermined set of first addresses and at least some of the second addresses.

15. Electronic apparatus as claimed in claim 12, wherein the means for selecting a first address comprising a keyboard.

16. Electronic apparatus as in claim 12 wherein the means for correlating has each of the first addresses correlated with a respective separate one of the second addresses.

17. Electronic apparatus comprising:
   means for selecting a first address from a predetermined set of first addresses;
   means for providing a plurality of user selectable functions, each of the functions having a respective second address associated therewith; and
   means for correlating each of the first addresses with one of the second addresses, wherein all of the first addresses are correlated with the second addresses; and
   a second memory means for storing data of the predetermined set of first addresses with the second addresses and, means for automatically transferring the correlation data from the second memory means to the first memory means;
   wherein, upon selecting one of the first addresses, a single correlated one of the second addresses is selected to perform the function associated therewith; and
   wherein the correlating means comprises first memory means adapted to store in correlated relationship the predetermined set of first addresses and at least some of the second addresses.

18. Electronic apparatus as claimed in claim 17, further including a main body and a remote device adapted to be removably coupled to the main body, the first memory means being provided in the main body and the second memory means being provided in the remote device, the apparatus further including means for detecting when the remote device is coupled to the main body, and means responsive to the detecting means for automatically transferring the stored correlation data from the second memory means to the first memory means when the remote device is coupled to the main body.

19. Electronic apparatus as claimed in claim 17, wherein the first memory means is volatile and the transferring means automatically transfers the correlation data from the second memory means to the first memory means when electrical power is established.

20. Electronic apparatus as claimed in claim 19, wherein the first memory means comprises a random access memory.

21. Electronic apparatus as claimed in claim 17, wherein the second memory means forms part of a memory having portions for storing information other than the correlation data.

22. Electronic apparatus comprising:
   means for selecting a first address from a predetermined set of first addresses;
   means for providing a plurality of user selectable functions, each of the functions having a respective second address associated therewith; and
   means for correlating each of the first addresses with one of the second addresses, wherein all of the first addresses are correlated with the second addresses; and
   wherein, upon selecting one of the first addresses, a single correlated one of the second addresses is selected to perform the function associated therewith; and
   wherein the first addresses are correlated, by the means for correlating, to only a limited number of the second addresses, the limited number being less than a total number of the second addresses.

23. Electronic apparatus comprising:
   means for selecting a first address from a predetermined set of first addresses;
   means for providing a plurality of user selectable functions, each of the functions having a respective second address associated therewith; and
   means for correlating each of the first addresses with one of the second addresses, wherein all of the first addresses are correlated with the second addresses; and
   wherein the means for correlating has more than one of the first addresses correlated with a single one of the second addresses; and wherein, upon selecting one of the first addresses, a single correlated one of the second addresses is selected to perform the function associated therewith.

24. A radio telephone comprising:
   means for selecting a first address from a predetermined set of first addresses;
   means for providing a plurality of user selectable functions, the means for providing including an EEPROM, each of the functions having a respective second address associated therewith in the EEPROM;
   means for correlating each of the first addresses with one of the second addresses comprising a RAM with a look-up table of the first addresses and the second addresses wherein, upon selection of one of the first addresses, the user selectable function associated with the second address correlated with the selected first address is selected and wherein all of the first addresses are correlated with the second addresses; and
   means for altering correlation between the first and second addresses in the RAM to allow the functions in the EEPROM to be accessed by the first addresses in a selectable order.

\* \* \* \* \*